(12) United States Patent
Wong et al.

(10) Patent No.: US 6,434,459 B2
(45) Date of Patent: *Aug. 13, 2002

(54) AUTOMOBILE INFORMATION SYSTEM (75) Inventors: William S. Wong, Redmond; Lawrence W. Lee, Bellevue, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/337,693

(22) Filed: Jun. 21, 1999

Related U.S. Application Data (63) Continuation of application No. 09/337,693, filed on Jun. 21, 1999, and a continuation-in-part of application No. 08/771,343, filed on Dec. 16, 1996, now Pat. No. 5,957,985.
(60) Provisional application No. 60/095,504, filed on Aug. 5, 1998.

(51) Int. Cl.⁷ .............................. G06F 7/00; G05B 15/02
(52) U.S. Cl. ........................................... 701/36; 701/48
(58) Field of Search .............................. 701/36, 29, 33, 701/48; 710/110, 126, 129, 243; 709/107, 208, 250, 253, 302

(56) References Cited

U.S. PATENT DOCUMENTS 4,937,811 A * 6/1990 Harris ........................... 370/5
5,091,856 A * 2/1992 Hasegawa et al. ............ 701/36
5,224,124 A * 6/1993 Hamano et al. .............. 375/37
5,351,041 A * 9/1994 Ikata et al. ............. 340/825.24
5,369,581 A * 11/1994 Ohsuga et al. ................ 701/48
5,369,584 A * 11/1994 Kajiwara ...................... 701/36
5,408,471 A * 4/1995 Nobutoki et al. .......... 370/85.9
5,438,506 A * 8/1995 Oho et al. ..................... 700/9
5,856,976 A * 1/1999 Hirano ........................ 370/401

* cited by examiner

Primary Examiner—Tan Nguyen
(74) Attorney, Agent, or Firm—Lee & Hayes, PLLC (57) ABSTRACT

An automobile information system facilitates communication within clusters of components and among various clusters. Each cluster has logically related automobile components (e.g., environment control components, entertainment components, etc.) interconnected to a cluster controller connected via a data communications bus. The cluster controller is responsible with disseminating information received from an external source and exchanging information between two or more components. The cluster controller is implemented as a general-purpose computing device having an open platform operating system, which supports multiple applications and provides interfaces to the components. The cluster controllers are interconnected via another data communications bus to enable information flow between clusters. In this manner, any component in one cluster can share information with any component in another cluster without need for dedicated wiring or specially written code.

19 Claims, 4 Drawing Sheets

AUTOMOBILE INFORMATION SYSTEM

RELATED APPLICATIONS

This is a continuation of U.S. patent application Ser. No. 09/337,693, filed Jun. 21, 1999.

U.S. patent application Ser. No. 09/337,693 is a continuation of U.S. Provisional Patent Application No. 60/095,504, filed Aug. 5, 1998 and a continuation-in-part of U.S. patent application Ser. No. 08/771,343, filed Dec. 16, 1996, now U.S. Pat. No. 5,957,985, which issued Sep. 28, 1999. Both of these applications are incorporated by reference.

TECHNICAL FIELD

This invention relates to information systems for automobiles.

BACKGROUND

In traditional automotive electronic systems, dedicated components are employed to control specific functions in the vehicle. These dedicated components are typically independent of one another, each with its own operator interface. For instance, most modern automobiles have an electronic engine control system, a computerized antilock braking system (ABS), a vehicle safety system, a lighting control system, a climate control subsystem, and a sound system. Most vehicles also have power door locks, power windows, and power seating for the operator's comfort.

Some automobile models are equipped with a navigation system that employs a global positioning system (GPS) receiver to receive positioning signals from a satellite network. The navigation system computes coordinates that locate the vehicle over the surface of the earth with regard to longitude, latitude, and altitude. Cellular communication systems have also been introduced into automobiles to enable the driver or occupant to transact telephone calls from their vehicle. Most late model automobiles are also constructed with a diagnostic system that analyzes the performance of the automobile engine, air and heating system, and other components (1996 or later for OBD II, 1993 or later for OBD I).

While these various electronic control units have proven useful, there is a drawback in that all of them are entirely separate and independent from one another. Generally, different manufacturers supply these subsystems. These disparate components often employ proprietary, dedicated processors or ASICs (application specific integrated circuits) that have different system architectures and execute incompatible proprietary software. The components have limited or no communications with one another.

Yet, today's automotive electronic systems increasingly encompass a broader range of functionality, such as task management, resource management, communication with other control units or systems, time-critical monitoring and control of equipment. This requires increased integration of components into networks of distributed and multiplexed electronic system, as well as interfaces for s communication between the control units and for communication with the operator. The motivations for this increased integration of the automotive electronic system are many, including:

Cost reduction of existing functions;
Cost effective improvement of existing functions;
Cost effective enabling of new functions;
Reduction of wiring weight;
Simplify addition of new functions via software upgrade;
Optimization of electronic and mechanical integration;
Increase of system performance, intelligence, and coherent; and
Increase data communications with external systems/infrastructure.

Some strides have been made to integrate the components. Typically, the proposals call for each of the distributed components to be connected to a data bus, such as a CAN (Controller Area Network) protocol bus. Designers have theorized different multiplexing protocols and token passing protocols to facilitate communication over the bus. For more information on these proposals, the reader is directed to the following articles which appear in a publication from the Society of Automotive Engineers (SAE): Inoue et al., "Multiplex Systems for Automotive Integrated Control," *Multiplex Technology Applications in Vehicle Electrical Systems*, SP-954, No. 930002, copyright 1993; Azuma et al., "Development of a Class C Multiplex Control IC," *Multiplex Technology Applications in Vehicle Electrical Systems*, SP-954, No. 930003, copyright 1993; Mathony et al. "Network Architecture for CAN," *Multiplex Technology Applications in Vehicle Electrical Systems*, SP-954, No. 930004, copyright 1993; Szydolowski, "A Gateway for CAN Specification 2.0 Non-Passive Devices," *Multiplex Technology Applications in Vehicle Electrical Systems*, SP-954, No. 930005, copyright 1993; Neumann et al., "Open Systems and Interfaces for Distributed Electronics in Cars (OSEK)," *Automotive Multiplexing Technology*, SP-1070, No. 950291, copyright 1995; and Emaus, "Aspects and Issues of Multiple Vehicle Networks," *Automotive Multiplexing Technology*, SP-1070, No. 950293, copyright 1995.

While there has been some progress at interconnecting electronic components in a distributed system via a communication link, there is no commonly accepted standard for the main vehicle system bus and bus interface. Achieving the above objectives entails a system design that is flexible and scaleable, with the capability to manage complex functions.

SUMMARY

This invention concerns an automobile information system that facilitates communication within clusters of components and among various clusters. Each cluster has a controller that provides a platform for supporting many diverse components.

In one implementation, various automobile components are grouped into logical clusters. For example, components used to control an operator's environment in the automobile (e.g., climate control, lighting, seat position, window placement, door locks, etc.) might form a first cluster. Another cluster might contain components related to entertainment and communication functions (e.g., audio, navigation, cellular communications, etc.).

Each cluster has its own cluster controller to manage information flow among the cluster's components. A data communications bus interconnects the cluster controller and components. The cluster controller is responsible with disseminating information received from external sources to the various components with interest in the information as well as exchanging information between two or more components within the cluster.

Each cluster controller is implemented, for example, as a general-purpose computing device having an open platform operating system. The operating system offers a platform with APIs (application program interfaces) and DDIs (device driver interfaces) that allow developers to interface different peripheral components with a common controller.

The cluster controller supports multiple applications and provides interfaces for those programs to the hardware peripheral devices. The cluster controllers are interconnected via another data communications bus to enable information flow between clusters. In this manner, any component in one cluster can share information with any component in another cluster without need for dedicated wiring or specially written code.

BRIEF DESCRIPTION OF THE DRAWINGS

The same reference numerals are used throughout the drawings to reference like components and features.

DETAILED DESCRIPTION

General System

Figure 1:
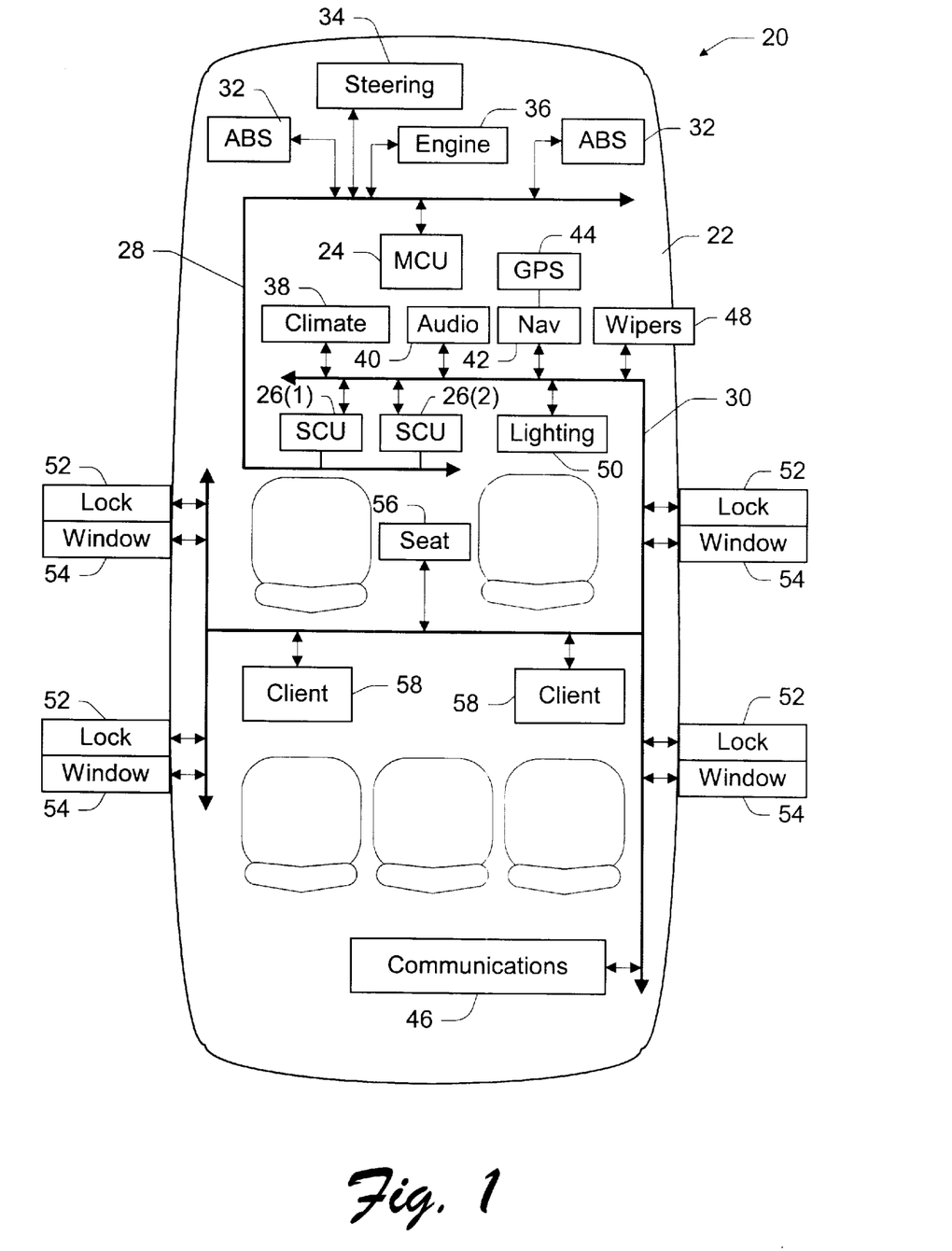
FIG. 1 is a diagrammatic illustration of a vehicle information and control system implemented in an automobile.

FIG. 1 shows vehicle information system 20 constructed in an automobile 22. The automobile control system 20 has a master control unit (MCU) 24 and one or more secondary control unit (SCU) 26(1) and 26(2). A dual bus structure having a primary data communications bus 28 and a secondary support bus 30 provide an infrastructure for data-communications in-the-control- system 20. The s primary bus 28 may be implemented using any vehicle bus design currently employed or contemplated by automobile manufactures, such as CAN, ABUS, VAN, J1850, K-BUS, P-BUS, I-BUS, USB, P1394, and so forth. The master control unit 24 can be configured as master of the primary bus 28. The support bus 30 may be implemented as any standard computer data bus, such as PCI, USB, P1394, and the like. One or both secondary control units 26(1) and 26(2) can be configured as master of the support bus 30 and as controller of one or more components coupled to the support bus 30.

The master control unit 24 and the secondary control unit(s) 26 are interconnected through the primary vehicle bus 28. In addition, various electronic automobile components are connected to the master control unit 24 via the primary bus 28. In this illustration, the electronic components include an antilock braking system (ABS) 32, an electronic steering system 34, and an engine control system 36. However, other components may likewise be connected to the primary vehicle bus 28, such as a security/alarm system, a diagnostic system, a lighting control system, a fuel injection system, an automatic transmission system, and so forth. In addition, the electronic components shown in FIG. 1 are intelligent components in that they each have their own local controller, typically embodied as a microprocessor. The automobile might further include non-intelligent electronic components that do not have local processing capabilities.

FIG. 1 shows a number of devices connected to the support bus 30. These devices include a climate control system 38, an audio system 40, a navigation system 42 with global positioning system (GPS) antenna 44, and a cellular communications system 46. The support bus 30 is also coupled to a wipers module 48, lighting control 50, power door locks 52, power window controls 54, and seat control 56. An SCU 26 may also be configured as a server to serve to multiple clients 58. The clients 58 can be implemented, for example, as small hand held or laptop game computers having visual display screens and audio sound cards to provide multimedia entertainment. The SCU 26 serves in-car entertainment in the form of movies and games to the clients 58 for the passengers' enjoyment.

The control units 24 and 26 can be arranged in two different architectures: (1) master/slave architecture; and (2) cluster architecture. In a master/slave architecture, the master control unit 24 acts as the master of the primary vehicle bus 28 and all electronic components 32–36, as well as the secondary control unit(s) 26, act as slaves to master control unit 24. The master control unit 24 manages data flow among the electronic components 32–36 and facilitates resource and information sharing. In addition, the master control unit 24 provides backup for the intelligent electronic components in the event that any of them fail, and also performs data processing and control functions for non-intelligent electronic components. This architecture is described in detail in U.S. patent application Ser. No. 08/771,343, entitled "Fault-Resilient Automobile Control System", which was filed Dec. 16, 1996, and issued as U.S. Pat. No. 5,957,985 on Sep. 28, 1999. This patent is assigned to Microsoft Corporation and is incorporated by reference.

Cluster Architecture

In a cluster architecture, the control units 24 and 26 (or the two secondary control units 26(1) and 26(2)) act as cluster controllers to control groups of related components. For example, a cluster controller might provide control of lights, climate control system (heating, ventilation and air conditioning), windshield wipers, seat adjustments. Another cluster controller may provide more advanced features, such as access to vehicle diagnostic information, intelligent door lock, remote alarm/unlocking, and configurable instrument panel and head-up display. With a cluster controller, the functionality of the core subsystems can be greatly enhanced by sharing hardware resources and information among the components and subsystems. It also provides maximum flexibility and allows additional functionality to be added as new components to the system without having to redesign the entire system.

Figure 2:
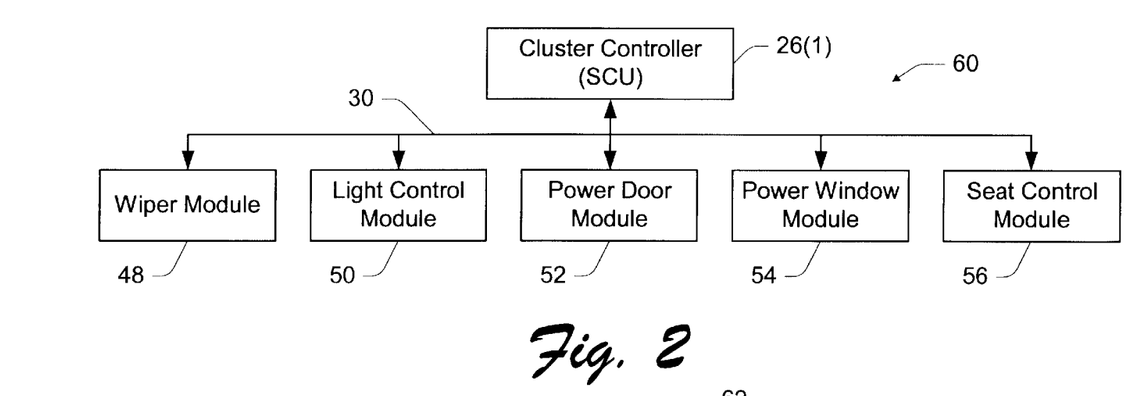
FIG. 2 is a block diagram of a cluster having a cluster controller to manage information flow among multiple components.

FIG. 2 shows an exemplary cluster architecture 60 in which one of the secondary control units 26(1) is configured as a cluster controller for the wipers module 48, lighting control module 50, door lock modules 52, power window control modules 54, and a seat control module 56. The cluster controller 26(1) facilitates information sharing among the cluster of components over bus 30. For example, suppose the vehicle operator sets the vehicle alarm system when exiting the vehicle. The vehicle alarm system informs the cluster controller 26 that the alarm is now activated. When the cluster controller 26 receives this notification, this single piece of information is shared among the components so that those components with interest may take some sort of action. Here, the lighting control module 50 may blink the interior lights to provide feedback to the operator that the alarm has been set. Concurrently, the door lock modules 52 and power window controls 54 are toggled to a locked state to prevent unwanted entry.

With the cluster architecture, multiple clusters can be interconnected via one or more data buses to communicate with each other. Communication between clusters enables increased functionality of the system and helps reduce cost, simplify information communication, and optimize functions.

In traditional prior art systems, dedicated wiring is required for one component to communicate with another component. Consider the example of adding a feature of remote locking and unlocking of the vehicle doors via telephone or email. To perform this task, the traditional solution is to add wiring between the door lock control module 52 and communication module 46 to form a dedicated communication link. Then, special software is written to enable the communication module 46 to receive the instruction to lock the door and to send that instruction to the door look control module 52. Moreover, one or both of the modules needs to be adapted to communicate according to a specific protocol employed by the other.

Figure 3:
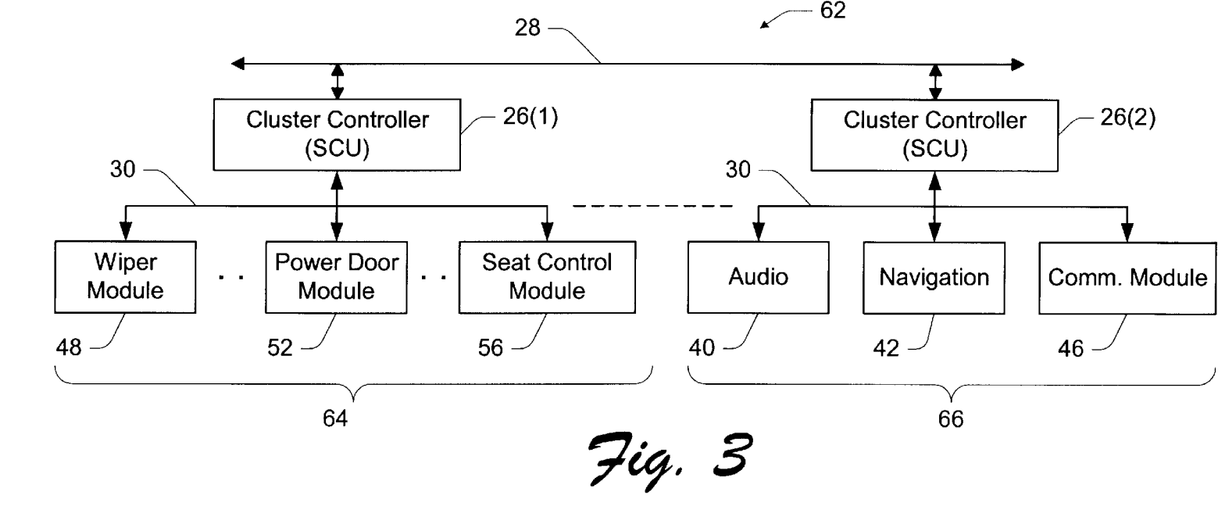
FIG. 3 is a block diagram of two clusters, with the cluster controllers interconnected to one another.

In the clustering architecture, however, the communication link between the cluster controllers handles the communication between various components without need of special wiring or programming. FIG. 3 shows a cluster architecture 62 in which two clusters 64 and 66 are interfaced together. The first cluster 64 is the same as that shown in FIG. 2, with cluster controller 26(1) controlling the components related to the vehicle operating environment (e.g., wipers 48, door locks 52 and seat control module 56). The first cluster controller 26(1) interfaces with these components via bus 30.

A second cluster controller 26(2) controls the second cluster 66, which groups communication and entertainment functions. In this example, the second cluster controller 26(2) facilitates communication and information flow among the audio module 40, the navigation component 42, and cellular communications module 46. The second cluster also utilizes the bus 30, although a separate bus may be used.

The first and second cluster controllers 26(1) and 26(2) are connected via bus 28. The cluster controllers 26(1) and 26(2) facilitate communication flow between any component in the first cluster 64 and any component in the second cluster 66 over the second bus 28. The two cluster controllers 26(1) and 26(2) can utilize a common communications protocol to communicate over bus 28, thereby eliminating the need for one peripheral device to be specially programmed to communicate with another peripheral device. Furthermore, no dedicated wiring is required.

Consider again the example of adding a feature of remote locking and unlocking of the vehicle doors via telephone or email. Here, an operator can send a command to lock the vehicle doors using email or a cell phone and the command is received at the cellular communications module 46 (or its cluster controller 26(2) and passed to the communications module 46). The communications module 46 then transmits a signal destined to the door module 52 over bus 30 to its cluster controller 26(2), which in turn transmits the signal over bus 28 to cluster controller 26(1). The signal is then delivered over bus 30 to the door module 52.

It is noted that although the implementation illustrated in FIG. 3 utilizes the same secondary bus 30 to facilitate information flow within the clusters, separate and distinct buses may be employed within the various clusters. Furthermore, since the clusters are implemented using a single platform (described below in more detail), additional software modules can be easily added to the system to perform the desired function, i.e., locking or unlocking the vehicle via phone or email.

Cluster Controller

Figure 4:
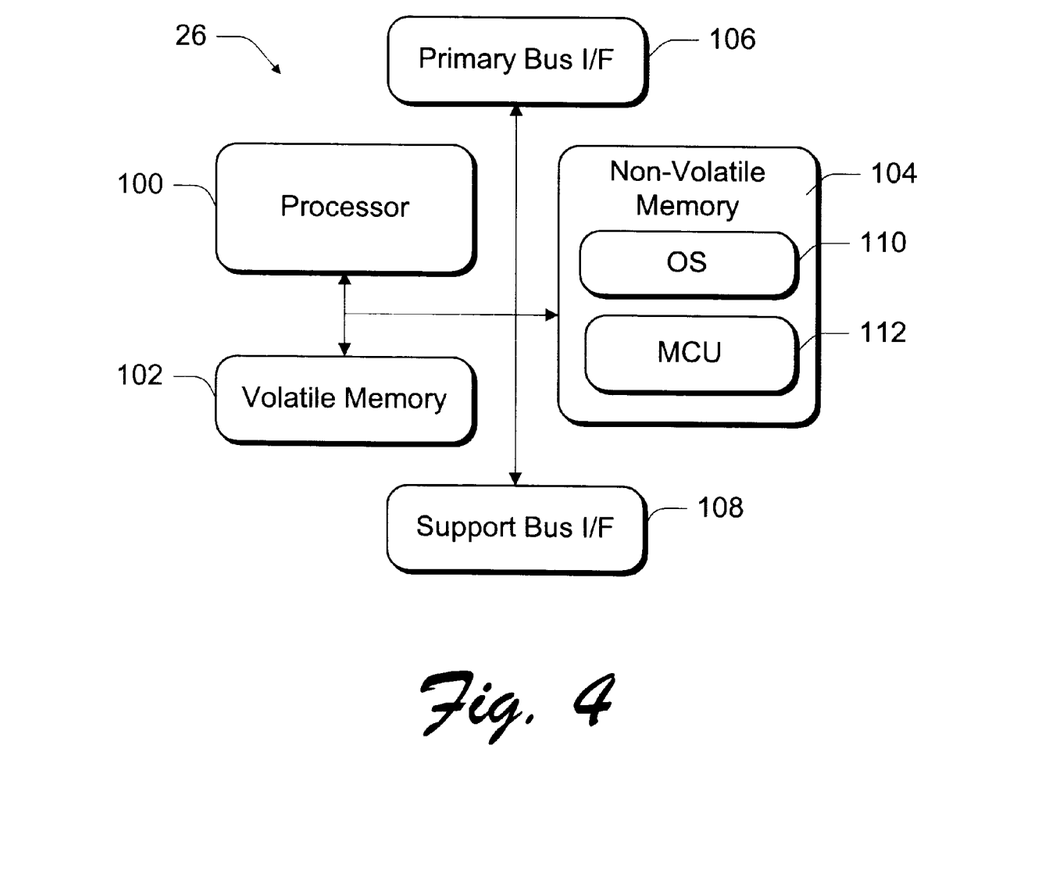
FIG. 4 is a block diagram of a cluster controller.

FIG. 4 shows an exemplary implementation of a cluster controller. In this illustration, the cluster controller is implemented as a secondary control unit 26, which is embodied as a general-purpose computer with an open platform operating system capable of supporting multiple applications. The master control unit 24 can be configured in a very similar manner.

The cluster controller 26 has a processor 100, volatile memory 102 (e.g., RAM), and non-volatile memory 104 (e.g., ROM, Flash, hard disk, etc.). The cluster controller 26 has a primary bus interface 106 to provide access to the primary vehicle bus 28 and a support bus interface 108 to provide access to the support bus 30.

The cluster controller 26 runs an open platform operating system 110 that supports multiple applications. With an open platform operating system, the cluster controller 26 can support a wide variety of software applications and hardware peripherals on the support bus 30. The operating system is preferably a real-time, multitasking operating system that is capable of supporting "plug-and-play" system configuration and providing high stability, security, and efficiency. One preferred operating system is a "Windows" brand operating system sold by Microsoft Corporation, such as "Windows CE", "Windows NT", or other derivative versions of "Windows". A multitasking operating system allows simultaneous execution of multiple applications.

The cluster controller 26 might also include at least one storage drive—such as a CD ROM drive, PC Card drive, or a floppy disk drive—which permits use of portable storage media. A CD ROM drive enables application-related CDs, as well as musical, video, game, or other types of entertainment CDs. The cluster controller 26 is constructed and sized to mount in the dashboard of the vehicle. A detailed explanation of one suitable construction of a cluster controller is described in U.S. Pat. No. 5,794,164, entitled "Vehicle Computer System," which issued Aug. 11, 1998, in the names of Richard D. Beckert, Mark M. Moeller, and William Wong. This application is assigned to Microsoft Corporation and is hereby incorporated by reference.

The SCU 26 maintains an up-to-date copy of executable code 112 run by the MCU 24 to manage data flow among the components. The MCU code 112 is downloaded to the SCU 26 during initialization and stored in the non-volatile memory 104. In the event that the MCU 24 fails, the secondary control unit 26 executes the MCU code 112 to assume the master responsibility of data flow management on the primary bus 28.

Cluster Controller Software Architecture

Figure 5:
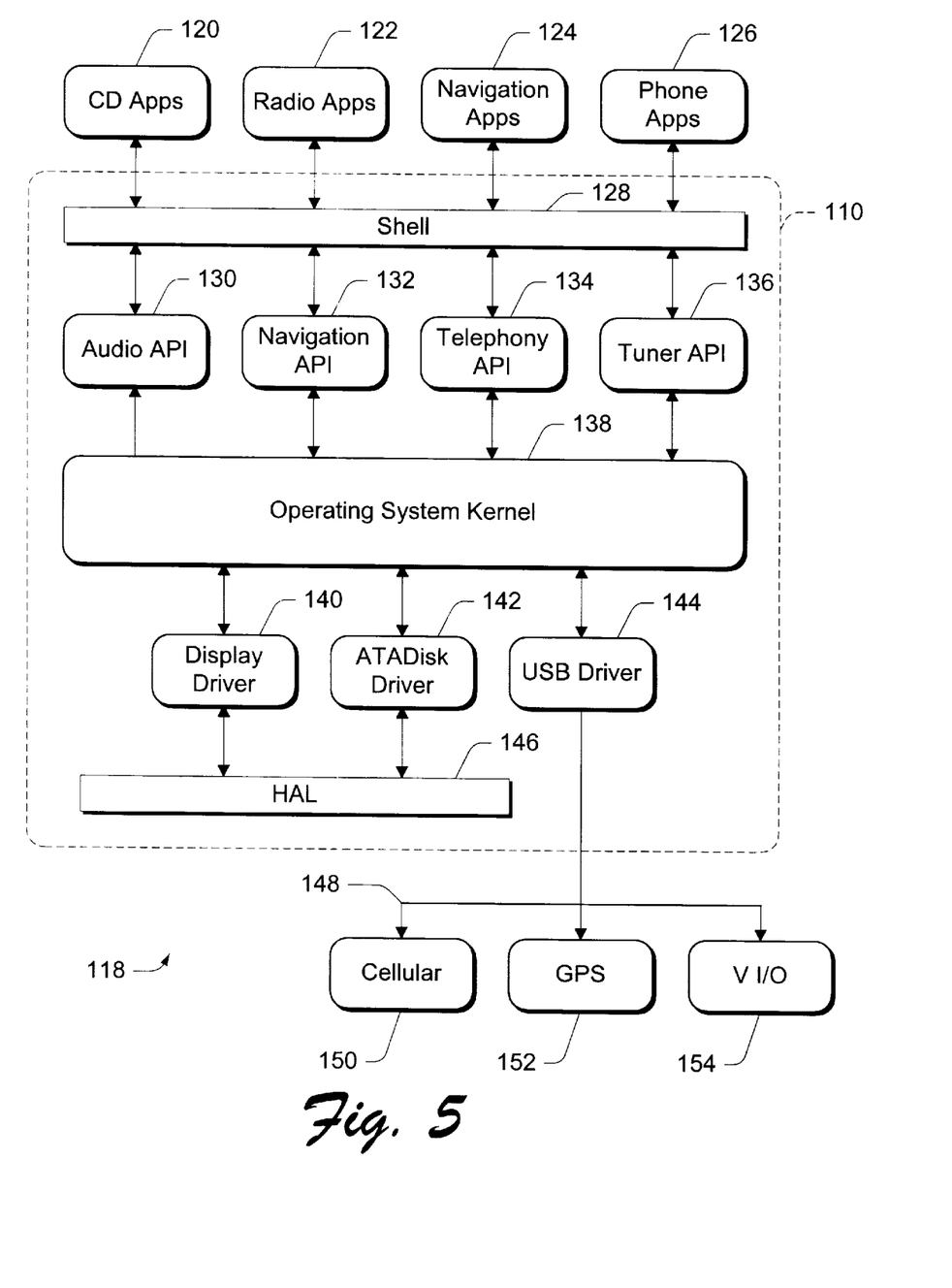
FIG. 5 is a block diagram of software architecture employed in the cluster controller.

FIG. 5 shows the software architecture 118 employed in the cluster controller 26. The cluster controller architecture 118 has an application layer supported by an operating system and an underlying hardware layer.

Four applications are shown in the application layer. A CD (compact disk) application 120 operates a CD player and a radio application 122 controls AM/FM radio functionality. A navigation application 124 utilizes the navigation and GPS components 42 and 44, and a phone application 126 operates the communications module 46.

The operating system 110 contains a shell 128, application programming interfaces (APIs) 130–136, a kernel 138, device driver interfaces (DDIs) 140–144, and a hardware abstraction layer (HAL) 146.

The APIs 130–136 define the interfaces to the system platform that are available to the application programs 120–126. Each API provides a common and consistent set of interfaces for applications development and provides access for the applications 120–126 to advanced features of the operating system. In this illustration, an audio API 130 provides interfaces for the CD application 120 and radio application 122. Navigation API 132 provides interfaces for the navigation application 124 and a telephony API 134 provides interfaces for the phone application 126. A tuner API 136 provides interfaces for the radio applications The kernel 138 provides the base operating system functionality. It is responsible for memory management, process management, and certain required file management functions. More specifically, the kernel manages virtual memory, scheduling, multitasking, multithreading, and exception handling.

The device driver interfaces (DDIs) 140–144 expose the services of a peripheral device to the kernel and applications. A well-defined set of DDIs allows different device drivers to look alike to the operating system and application software, removing the need to specifically tailor the operating system or application software to the device it communicates with. Here, a display driver 140 provides interfaces to a display (e.g., monitor, LCD), a disk driver 142 provides interfaces to the memory disk drive peripheral, and a USB (universal serial bus) driver 144 provides interfaces for a USB bus 148.

A hardware abstraction layer (HAL) 146 is a thin layer of code that provides the interface between the kernel and the device hardware. Its goal is to provide software that allows a device driver to support the same device on all hardware platforms. This allows variations in hardware platforms (using different processors) without requiring a separate version of the operating system for each one.

The cluster controller architecture 118 of FIG. 5 is specifically tailored for an in-vehicle multimedia information and communication system. This architecture provides an example of how cluster controller 26(2) might be configured to run cluster 66 (FIG. 3). The cluster controller architecture 118 incorporates the functions of a radio, CD player, navigation, address book, paging, email, cellular phone, as well as a user-friendly display. The in-vehicle entertainment and information system is built on the flexible operating system 110 with common interfaces to enable developers to develop multiple devices and applications, without having to tailor these developments to a specific hardware platform or processor.

Alternatively, cluster controller 26(1) that governs cluster 64 in FIG. 3 might be configured to run different applications and interface with different hardware components. For example, cluster controller 26(1) might support applications pertaining to wipers, power door locks and seat controls, and the HAL 146 and DDIs provide interfaces for the wiper peripheral device, the door locks module, and the seat module.

Conclusion

The cluster architecture, with an open system OS platform-based controller at its core, allows construction of a vehicle information system that can handle multiple devices, run multiple applications, and permit communications among the devices. The devices can range from simple sensors and actuators or some semi-intelligent devices such as the entry control system, to intelligent devices such as a digital signal processor. The information flow is managed over common buses, with standard protocols, rather than dedicated wiring and specialized protocols.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An automobile information system comprising:
   a first data communications bus;
   a first cluster of components connected to the first data communications bus;
   a first cluster controller connected to the first data communications bus to manage information among the first cluster of components, and facilitate information flow between components in the first cluster of components;
   a second cluster of components connected to the first data communications bus;
   a second cluster controller connected to the first data communications bus to manage information among the second cluster of components, and facilitate information flow between components in the second cluster of components; and
   a second data communications bus to interconnect the first and second cluster controllers.

2. An automobile information system as recited in claim 1, wherein the first and second cluster controllers are each configured as general-purpose computers having open platform operating systems.

3. An automobile information system as recited in claim 1, wherein communication between a component in the first cluster and a component in the second cluster is facilitated via the first and second cluster controllers.

4. An automobile information system as recited in claim 1, wherein the first cluster of components comprises components selected from a group of components comprising a climate control component, a lighting component, a windshield wipers component, a door lock component, and a power window component.

5. An automobile information system as recited in claim 1, wherein the second cluster of components comprises components selected from a group of components comprising an audio component, a navigation component, and a communications component.

6. An automobile comprising an automobile information system as recited in claim 1.

7. An automobile information system comprising:
   a data communications bus;
   a first group of multiple components connected to the data communications bus;
   a second group of multiple components connected to the data communications bus;
   a first cluster controller to manage information among the first group of multiple components; and
   a second cluster controller to manage information among the second group of multiple components.

8. An automobile information system as recited in claim 7, wherein a component in the first group can receive information from a component in the second group via the data communications bus.

9. An automobile information system as recited in claim 7, further comprising a second data communications bus to interconnect the first and second cluster controllers, wherein a component in the first group can receive information from a component in the second group via the second data communications bus.

10. An automobile comprising an automobile information system as recited in claim 9.

11. An automobile information system as recited in claim 7, wherein the first and second cluster controllers each comprise a general-purpose computer with an open platform operating system.

12. An automobile information system as recited in claim 7, wherein the first and second cluster controllers together comprise a general-purpose computer with an open platform operating system.

13. An automobile information system as recited in claim 7, wherein the first cluster controller receives information from an external source and shares the information with the first group of multiple components.

14. An automobile information system as recited in claim 7, wherein the first cluster controller facilitates information flow between at least two of the components of the first group.

15. An automobile comprising an automobile information system as recited in claim 7.

16. An automobile information system comprising:
   a data communications bus;
   a first group of multiple components connected to the data communications bus;
   a second group of multiple components connected to the data communications bus;
   a first cluster controller having an open platform, multitasking operating system to support multiple applications and provide interfaces to the first group of multiple components; and
   a second cluster controller having an open platform, multitasking operating system to support multiple applications and provide interfaces to the second group of multiple components.

17. An automobile information system as recited in claim 16, further comprising a second data communications bus to interconnect the first and second cluster controllers.

18. An automobile comprising an automobile information system as recited in claim 16.

19. An automobile comprising an automobile information system as recited in claim 17.

* * * * *

UNITED STATES PATENT AND TRADEMARK OFFICE
CERTIFICATE OF CORRECTION

PATENT NO. : 6,434,459 B2  Page 1 of 1
DATED : August 13, 2002
INVENTOR(S) : Wong et al.

It is certified that error appears in the above-identified patent and that said Letters Patent is hereby corrected as shown below:

Title page,
Item [56], U.S. PATENT DOCUMENTS, delete the cited reference "5,369,581".
FOREIGN PATENT DOCUMENTS, add the cited reference
-- WO 98/31118     07/1998     PCT --.
OTHER PUBLICATIONS, add the following cited references:
-- Harata, Y. et al, A Simplified Serial Communication Network Within a Vehicle, Toyota Central Research and Development Labs, Inc., Japan, May 1989, IEEE 39th Vehicular Technology Conference Volume 1, pp. 438-442 --.
-- Raith, T. et al., Netzwerke zur Integration von Systemfunktionen der Kraftfahrzeug-Elektronik, R. Oldenbourg Verlag, June 1995, Informationstechnik und Technische Informatik 37, pp. 28-35 --
-- Sasaki H. et al., LSI Technology for Meeting the Quality Goals for Automotive Electronics, NEC Corp., October 1990, Society of Automotive Engineers, Inc., pp. 241-248. --
-- Schmidt, E. et al., Required Elements of Integrated Vehicle Control Systems, GM Advanced Engineering Staff General Motors Technical Center, October 1990, Society of Automotive Engineers, Inc., pp. 463-471. --
-- Electricite, Revue Technique Automobile, France, 1991, Dossier, pp. XLVII-LVI --
-- Heberle, Klaus, So schnell wie notig, so langsam wie moglich, November 1992, Elektronik, pp. 78-83 --

Column 3,
Line 33, delete "s" between "The" and "primary".

Column 7,
Line 2, insert -- 122. -- after "applications".

Signed and Sealed this

Twelfth Day of August, 2003

JAMES E. ROGAN
*Director of the United States Patent and Trademark Office*